June 2, 1970 — P. J. WEAVER — 3,515,858
FLUIDIC TAPE READER
Filed April 1, 1969 — 2 Sheets-Sheet 1
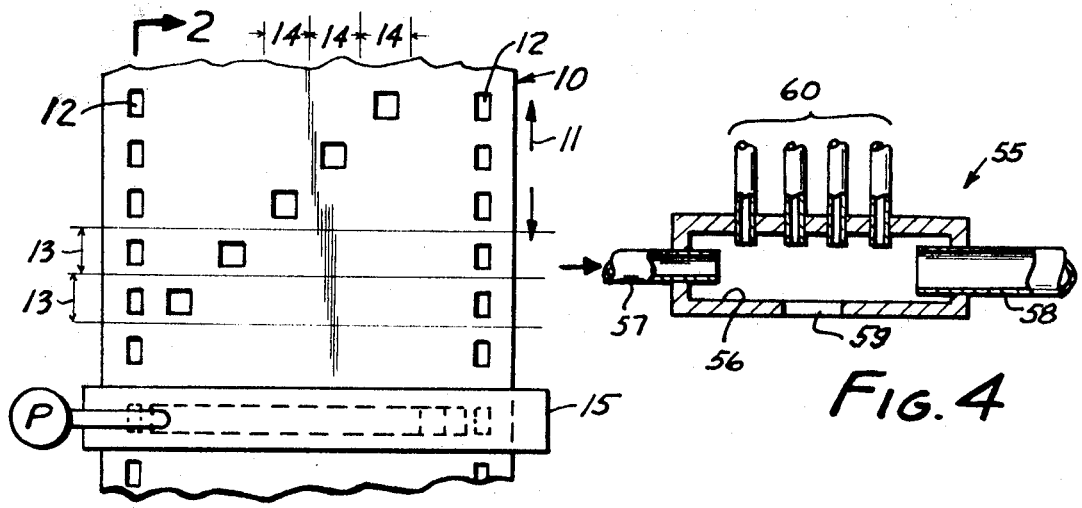
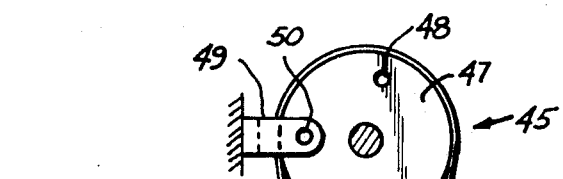
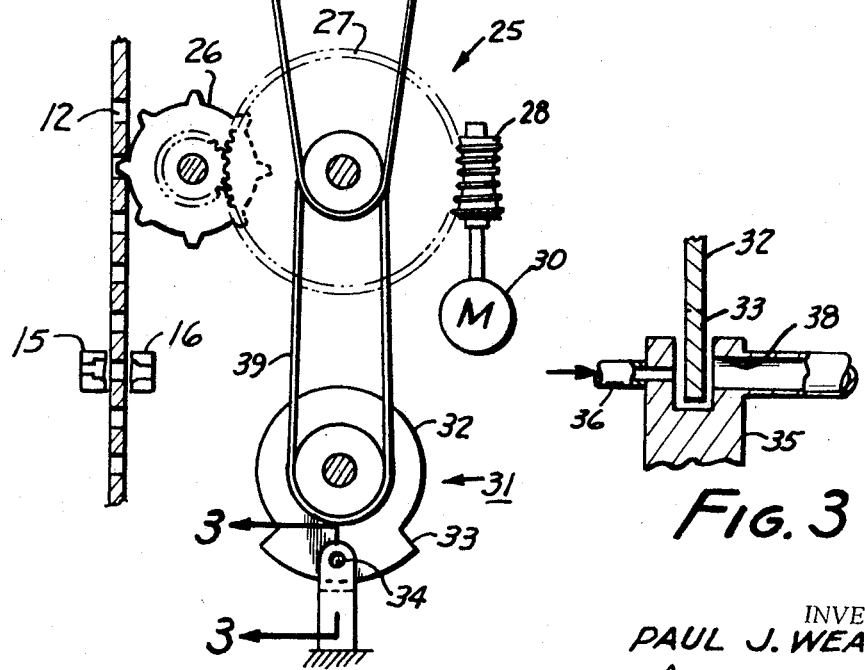
INVENTOR.
PAUL J. WEAVER
BY Angus & Mon
ATTORNEYS.

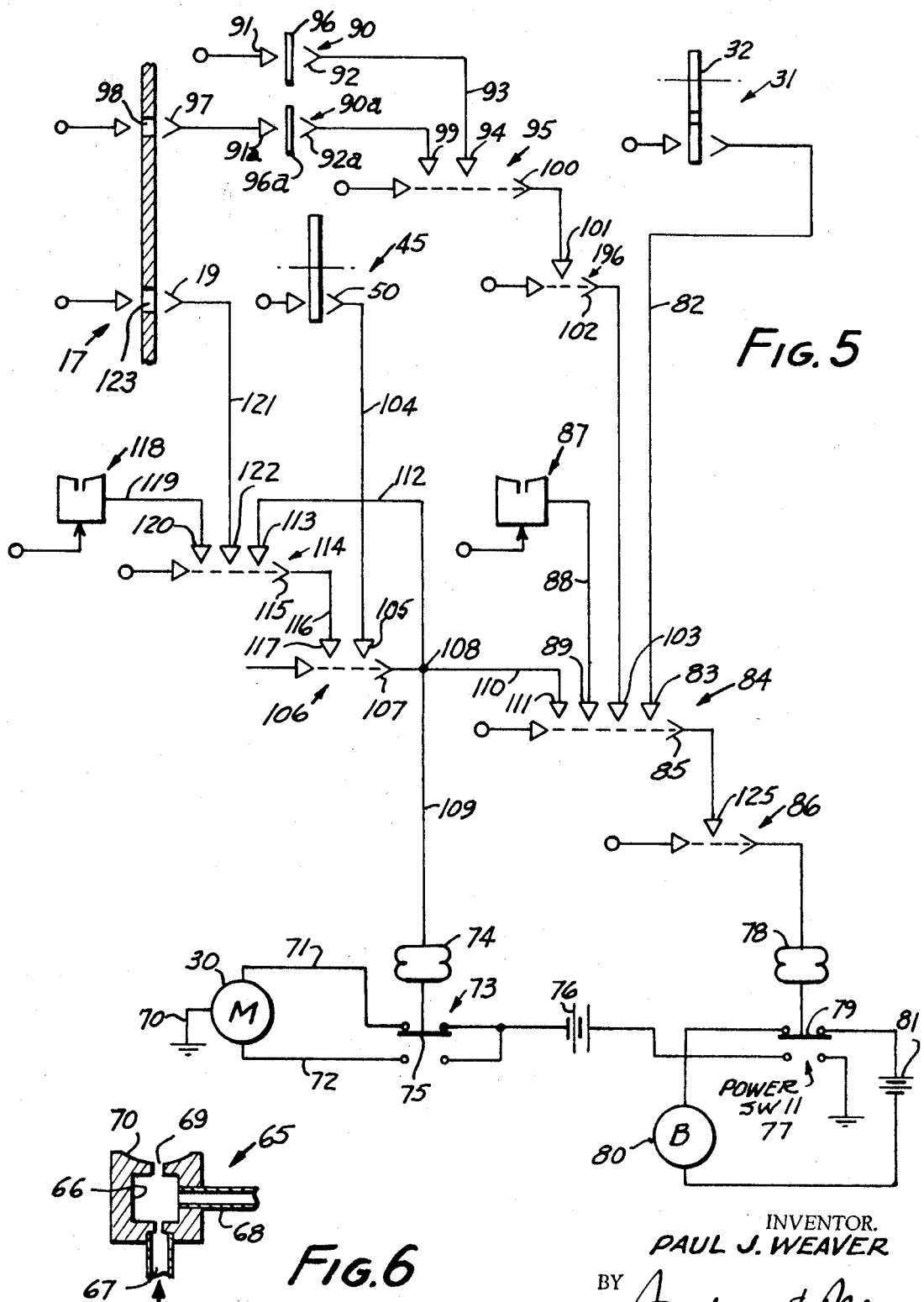

United States Patent Office 3,515,858
Patented June 2, 1970

3,515,858
FLUIDIC TAPE READER
Paul J. Weaver, 2790 Gainsborough Drive,
San Marino, Calif. 91108
Filed Apr. 1, 1969, Ser. No. 811,889
Int. Cl. G06k 7/02
U.S. Cl. 235—61.11        7 Claims

ABSTRACT OF THE DISCLOSURE

A fluidic tape reader for use with tapes or cards which are perforated with blocks of information, which is adapted to be stepped from block to block, and automatically returned to its start condition. The mechanism is fluidically actuated so as to operate the motor which drives the elongated information bearing member in either of its two directions.

---

This invention relates to a tape reader, and especially to a transport mechanism for advancing an information bearing elongated member (sometimes referred to as a tape or card) from block to block of information in step wise manner, and for returning the member to its start position when the program has been completed.

Numerous devices have been proposed and built for the step by step advancement of information bearing elongated media. Their functions are all substantially the same in that it is intended to move the program one step at a time, accomplish a function, and move another step. Then at the completion of a series of steps defining a program, the program is returned to its start position. It is the object of this invention to provide a fluidic control device which is completely compatible with a pneumatic punched tape reader, which is simple in concept, and inexpensive in construction.

Mechanism according to this invention includes an elongated member movable along an axis and carrying a plurality of blocks of information, there being a plurality of channels in each block available for containing information. A pressure manifold is placed on one side of the elongated member, and a first sensor on the opposite side thereof for each channel. The sensor of one of the channels is sometimes referred to as a return to start sensor. A manifold and an array of sensors extends laterally relative to said axis so as to encompass a single block of information at a time.

The axial movement of the elongated member presents a block sequentially thereto.

A hole in the elongated member will pass a pressure signal to a respective sensor aligned therewith.

Bi-directional motor means is provided for bi-directional driving a drive means which is engaged to the elongated member for moving it axially in either direction. First interrupter means is driven by the drive means, and comprises a first vane and a second sensor. The first vane changes the condition of the second sensor periodically and proportionally to the movement of the elongated member by one block. Second interrupter means is driven by the drive means and comprises a second vane and a third sensor. The second vane changes the condition of the third sensor when the elongated member is in its start position in the program. Power switch means responsive to a change of condition in the sensors controls operation of a power switch to drive the motor. Reversing switch means is responsive to change in condition of the return-to-start sensor and is adapted to cause the motor to drive in its reverse direction. Start means comprises a signal source for the power switch means for driving the motor in a forward direction.

According to a feature of the invention the various ones of the switch sensor means comprise fluidic means responsive to pneumatic signals, one class of such pneumatic signals being a signal transmitted through a perforation in the elongated member.

The above and other feature in this invention will be fully understood from the following detailed description of the accompanying drawings, in which:

FIG. 1 is a plan view showing a perforated tape or card with another part of the invention;

FIG. 2 is a cross section taken at line 2—2 of FIG. 1;

FIGS. 3 and 4 are schematic cross sections showing details of construction of the portions of the invention;

FIG. 5 is a circuit diagram, partly in schematic notation, showing the control circuit of the invention; and FIG. 6 is a schematic cross section showing another element of construction of the device.

In FIG. 1 there is shown an elongated member 10 which may be such as a tape or a card. It is relatively thin and has an axis of motion 11 which is bi-directional in nature. Two runs of sprocket holes 12 are provided for advancing the elongated member along the axis. The elongated member is divided into blocks of information 13 which extend laterally relative to the axis. The bits of information are arranged on channels 14 of which five are shown, one bit of the information being contained in each block of information as illustrated. There may be more or fewer channels. In any given block there may be no bits of information, or one as shown in the drawings, or more than one.

The purpose of this device is to program a machine tool or other project by advancing the blocks of information one by one, and responding to the information contained therein. The response to information is provided for by a pneumatic system which includes a first manifold 15 on one side of the elongated member with a jet directed at each channel which creates a zone of pressure at each channel along the entire block of information so that pressure will bleed through any perforation. On the reverse side there is a plurality of first sensors 16, one for each channel, and respective to an individual jet from the manifold.

The manifold and first sensors are shown relatively out of place and proportion in FIG. 2 but illustrates the situation wherein a pressure signal in the first manifold can blow through a perforation in the card and cause a pressure rise in the first sensor. The sensors are individual for each channel and there is no sensor relative to the sprocket holes as FIG. 2 may make it appear. One of these first sensors is a return to start sensor 17 which will be seen in greater detail and is shown schematically in FIG. 5. With respect to this sensor, attention is called to the schematic notation used therein. It will be seen a triangle-headed arrow directed at a perforation, in this case perforation 18, in a return-to-start channel will be received by a receiver 19 (sometimes called a "return-to-start sensor"). The receiver being schematically shown in FIG. 2. The receiver is the sensor in all such arrangements. Therefore, when a perforation is disposed between the source and receiver 19, pressure signal will exist in line 121 for purposes yet to be described.

The same result pertains with all of the first sensors, and also as to other sensors using receivers, as to their respective lines.

Now with further reference to FIG. 2 drive means 25 is shown which includes a sprocket 26, a drive-gear 27, and a worm gear 28. This system is driven by a bi-directional motor 30 which may be an electrical motor for convenience.

Drive gear 27 in turn drives a first interrupter means 31 which comprises a disc 32 with a vane 33 projecting from the periphery of the disc. The vane can fit in a second sensor 34 which comprises a yoke 35 extending on opposite sides of the disc. Such an arrangement is shown in greater detail in FIG. 3 where it will be seen that the pressure inlet 36 is interrupted by the vane so that no pressure exits at the pressure outlet 38. Because the pressure developed at the downstream port is the signal generated by the sensor for control purposes, this port is sometimes spoken of as the sensor 34 itself, and the same is true of the other sensors in the system. When the disc is turned so that the vane is not in the region between the inlet and the sensor, then a pressure signal will exist at the sensor. The disc is turned by a belt 39 driven from the drive gear. The gear reduction arrangement is such that there is a complete revolution made of disc 32 for each advancement of a single block of information on the card.

A second interrupter means 45 is similarly driven by a belt 46 from the drive gear but makes a full revolution only upon completion of the maximum program within the capacity of the machine, for example perhaps one full revolution for every 80 blocks of information. It, too, includes a disc 47 but its "vane" arrangement constitutes a hole 48 there through. The term "vane" thereby being subject to a reversal of parts in its meaning. It essentially comprises regions which do, and regions which do not occlude the sensor. A yoke 49 similar to that of FIG. 3 is provided. In this case however the disc entirely blanks off the passage to sensor 50 (sometimes called "third sensor") except when the hole is aligned therewith. The importance of this is that the concurrence of hole 48 with the sensor gives a signal which is indicative of the fact that the card is positioned in its start condition.

This concludes the disclosure of the drive mechanism for actually moving the card along its axis 11.

Before beginning a discussion of the control circuitry itself, it will be useful to illustrate in detail two circuit elements in order that they may be referred to schematically later. In FIG. 4 there is shown a device known as a fluid "nor" gate 55. Such a gate is a fluidic control, and may be a turbulent amplifier as shown, or may be a wall-adherent type, but in either case is a fluidic device which controls a fluid stream as a consequence of signals applied externally to it.

Such a device includes a chamber 56 with an inlet 57, and an outlet 58, a vent 59, and one or more (in this case four) control ports 60. The function of this device is that when there is no pressure signal applied at any of the ports, a fluid pressure signal at the inlet can flow directly through the chamber and form a fluid pressure signal at the outlet. If, however, a pressure signal is applied at any of the control ports the flow in the chamber becomes turbulent, is largely expelled through vent 59, and no substantial fluid build-up occurs at outlet 58. A consequence of this is that if there is always a pressure at the inlet, there will be a pressure at the outlet only when there is *no* pressure signal on any of the control ports. One or more control ports may be used, and devices of this class with various numbers are shown in FIG. 5.

FIG. 6 shows a manually controlled signal means 65. It constitutes a chamber 66 having an inlet 67, an outlet 68, a bleed port 69, and a depression 70 formed to guide the finger. When a fluid pressure signal is applied to inlet 67 there will be no substantial build-up in pressure outlet at 68, because the bleed will permit it to escape. Covering bleed port 69, such as by the finger, will cause a pressure signal to be exerted at outlet 68.

These devices of FIGS. 4 and 6 are shown schematically in FIG. 5. In this system, a constant pressure source is indicated by a small circle and a triangular head. The triangular heads indicate a source of pressure at a port. A dotted line between a source of pressure and the V shaped receiver indicates a flow path through a chamber, and the side arrows indicate the control ports. The outline configuration of the device of FIG. 6 will be evident from inspection.

The objective of the circuitry is to control the operation of motor 30. The motor is shown with ground 70, and leads 71, 72 of a split winding. These leads are connected to two sets of terminals of a reversing switch 73. This is a pressure switch actuated by a bellows 74 which moves a contact 75 between the two sets of terminals. When pressure is off and bellows 74 is in the condition shown, the motor would run in the forward direction. If pressure is on in the bellows, the other set of terminals will be connected, and the motor will run in the opposite return direction.

The source of power 76 is shown in the circuit and in connection with one terminal of a power switch 77. This switch, too, is pneumatically actuated having a bellows 78 and a contactor 79. When in the condition shown, the motor will not run. Instead, the switch actuates brake 80, which has its own power supply 81.

If pressure is applied to the bellows the other contactors will be connected and the motor will be run in whichever direction is determined by the reversing switch.

It is the function of the circuitry to properly actuate these two switches.

The first interrupter means 31 is shown connected by line 82 to control port 83 of a power switch means 84, which is a device of the construction of FIG. 4. The receiver 85 of the power switch means is connected to a signal inverter 86 which also forms part of the power switch means and is of the same general nature as the device of FIG. 4, except that it has but one control port.

A manual start means 87 comprises a device of the type shown in FIG. 6, that is connected by a line 88 to control port 89 of device 84.

Signal means 90, which includes a pressure source 91 and receiver 92 is connected by line 93 to the control port 94 of a device 95 similar to that of FIG. 4 but with only two control ports. A member 96 which is moved responsive to the movement of a machine tool element so as to indicate the completion of a desired motion can be interposed between the source and receiver so that a pressure signal can be applied to receiver 90 only when the member is not present. The member is shown present and cutting off the signal thereby representing a condition other than completion of a program step.

With this type of switch, a protrusion from the machine tool element which can contact vane 96 is conveniently mounted on a drum which is connected to the machine tool element in a customary manner. When the machine tool element completes its programmed motion, the protrusion moves the vane away from receiver 92, and a signal can pass to start the sprocket indexing motion. When this motion occurs, the drum will step in synchronism with the sprocket and permit member 96 to return to the illustrated interruption position. With sequential steps, different protrusions on the drum become effective and only one element 96 is required. An alternate means is shown with such an element 96a, with receiver 92a, pressure source 91a, in series with a receiver 97 which is adapted to receive a signal through a perforation 98 in the card.

With this type of control, a number of elements 90a can be disposed along the slide, together with a number of fingers on the machine tool element which are adapted to engage respective elements 96a. By disposing perforations 98 in various respective channels, a selection of devices 90a can be made. The two illustrated arrangements give broad design freedom to the designer. It is also possible to key the motion of this card to the motion of the machine tool element so that the presence of this perforation will start the cycle, in which case element 96a could be dispensed with or used collaterally. In any event, the output of receiver 92a is applied to control port 99 of device 95.

The receiver 100 of device 95 is applied to control port 101 of still another fluidic device 196 of the class of FIG. 4, whose receiver 102 is connected to control port 103 of device 84.

The second interrupter means 45 is similarly shown, its sensor 50 being connected by line 104 to control port 105 of a reversing switch means 106, which is a device of the same class as that shown in FIG. 4. The receiver 107 of means 106 is connected to a junction 108, which junction is connected by line 109 to bellows 74. Junction 108 is also connected by line 110 to control port 111 of device 84. It is also connected by line 112 to form a latch circuit by feeding back to control port 113 of still another device 114 similar to the device of FIG. 4, whose receiver 115 is connected by a line 116 to control port 117 of device 106.

A manual return-to-start signal means 118 of the type shown in FIG. 6 is connected by line 119 to control port 120 of device 114.

The return-to-start sensor 17 is shown with its receiver 19 connected by line 121 to control port 122 of device 114. Perforation 123 is shown for convenience in the same channel as perforation 98, but it will be understood that they will not actually be in the same channel. They will be in their own separate channels, because each controls a different function.

The operation of the system will now be described. To start the program the bleed port of the manual start signal means 87 will be covered. This will apply a signal to control port 89 and will cut off pressure to receiver 85. Fluid can therefore flow through device 86 because there is no flow through control port 125. Flow through device 86 will apply pressure to bellows 78, and switch the condition of the power switch so as to run the motor. At this time the motor will run, and it will also rotate disc 32 so that the vane is no longer in the way of the sensor device 31. This will then permit pressure to be applied to line 82 and control port 83, which will maintain the control condition which was begun by covering the bleed of device 87, even though the finger has been removed. This condition will remain until the disc has made a full turn so that it will again cover the receiver. When the receiver is covered, then the signal will disappear from port 83 and unless there is another control signal applied to it, device 85 will flow, cutting off device 86, relieving the pressure in bellows 87, and the power switch 11 will switch back to its contact with the terminals which caused the brake to be applied. The sprockets then stop, having moved the card by one block. There will be a certain amount of coasting in this operation, so that the apparent overlap of the vane is not important. In devices such as this there is always a more length of perforation than is needed, and there is about 60° of tolerance available.

The foregoing started the program, but accomplished only a single step. Now in order to accomplish an automatic stepping, reference is made to elements 90 and 90a. For this purpose it is desired to secure a signal at control port 103 and tracing back in the circuit to device 96 it will be seen that this will be accomplished if this latter device is flowing. Therefore there should then be no control pressure at port 101 meaning that there should be pressure on line 93 and control port 94. This is possible if element 96 is not between the source 91 and the receiver 92. Therefore, the conclusion of the machine step will remove the impediment from between these two elements and start the device in operation.

Again disc 32 will rotate, thereby supplying a signal which will remain in place and keep the device in operation until the step is concluded. Element 96 will be returned as a barrier as soon as the machine begins to operate. A like operation can be secured from device 96a and receiver 97, it being noted that the pressure signal will be attainable only when there is a perforation 98 adjacent to receiver 97.

Now the device will continue in automatic operation because the first interrupter means will permit the single step to take place and a new stepping operation will not be started until the machine tool indicates, by the removal of element 96, the completion of the step. This continues until the last step is reached and the return to start perforation 123 comes opposite its respective sensor 19.

Now the device is to be placed in its return-to-start condition, and the elongated member returned to its starting position. It will be noted that for this purpose it is desired to reverse the condition of switch 73 and this will be accomplished by applying pressure to bellows 74. This in turn is accomplished by applying pressure at junction 108. Pressure can be obtained at this junction so long as device 106 flows. This can be accomplished only when there is no pressure signal at both control ports 105 and 117. There will be no pressure at control port 105 unless the perforation in the disc of second interrupter means 45 is adjacent to receiver 50 and this will indicate the advice that the card has returned to its starting position and will operate as a definite cut off limitation. Therefore, reversal is accomplished by control over port 117 and this in turn will permit the flow of pressure to 108 so long as there is no pressure at control port 117 meaning that there is pressure at one of the three control ports of device 114.

The foregoing may be accomplished either by closing the port of return-to-start button 118, or by the convergence of perforation 123 with receiver 19. Whenever either of these conditions occurs, there will be no flow through device 114 meaning there will be pressure on at junction 108, and in turn this latches the circuit through control port 113 and the condition will be maintained until the control condition is reversed by application of pressure at control port 105. This occurs only when the perforation in the second interrupter means is aligned with port 50. With this pressure at junction 108 there is a control signal at 111 so that power switch 11 is switched to run the motor, and the pressure through line 109 applied pressure at bellows 73 to reverse the condition of the reversing switch so that the motor will remain in reverse operation until the second interrupter means cuts it off.

From the foregoing it will be seen that there exists by this invention a very simple fluidic device completely compatible with low pressure pneumatic systems comprising a group of inexpensive devices capable of convergent control, and which enables the manual or automatic stepping, and return-to-start of the program to be accomplished.

I claim:

1. Mechanism for sequentially presenting blocks of information in a program and returning the program to its start condition, comprising; an elongated member bi-directionally movable along an axis carrying a plurality of blocks of information, there being a plurality of channels available for containing information in each block; a return-to-start sensor responsive to one of said channels; a pressure manifold at one side of the elongated member and a first sensor on the opposite side of the member therefrom for each channel, including the return-to-start sensor, the manifold and array of sensors extending laterally to said axis so as to encompass a block of information, the axial movement of the elongated member presenting blocks sequentially thereto, a hole in the elongated member on a channel passing a pressure signal to the respective sensor when aligned with the sensor; bi-directional motor means; drive means driven by the motor and engaged to the elongated member for moving it axially in either direction; first interrupter means driven by the drive means comprising a first vane and a second sensor, the first vane changing the condition of the second sensor periodically and proportional to movement of the elongated member by one block; second interrupter means driven by the drive means comprising a second vane and a third sensor, the second vane changing the condition of the third sensor when the elongated member is in its start position in the program; power switch means responsive to the change of condition in the sensors; reversing switch means responsive to change in condition of the return-to-start sensor, said power switch means being connected to said motor for controlling its operation, and said reversing switch means being connected in series with said power switch means and the motor to determine the direction the motor is driven; start means comprising a signal source for the power switch for actuating the motor in a forward direction; and return-to-start means for actuating both the power switch means and the reversing switch means, whereby when the start means is actuated, the power switch means actuates the motor, and the first interrupter means maintains the power switch means condition until the movement of one block is completed, at which time its vane changes its sensor condition and deactuates the power switch means, said action continuing in increments until the program is completed at which time the return-to-start sensor means actuates the reverse switch means and the power switch means, and the motor is reversingly driven until the vane of the second interrupter means changes its sensor condition, and the mechanism stops with the elongated element at its start position.

2. Mechanism according to claim 1 in which the power switch means comprises a fluidic "nor" gate responsive to output of the start means, first interrupter means, second interrupter means, and the return-to-start sensor, and a pressure responsive power control switch responsive to gate output.

3. Mechanism according to claim 1 in which the reversing switch means comprises a fluidic "nor" gate responsive to output of the return-to-start sensor and of the third sensor, and a pressure responsive switch responsive to gate output, the gate output including a latch circuit subject to interruption by the second interrupter means.

4. Mechanism according to claim 3 in which the power switch means comprises a fluidic "nor" gate responsive to output of the start means, first interrupter means, second interrupter means, and the return-to-start sensor, and a pressure responsive power control switch responsive to the latter gate output.

5. Mechanism according to claim 4 in which the start means includes a first manually-actuable signal means, and signal means actuable by the motion of a machine tool part.

6. Mechanism according to claim 5 in which a second manually actuable signal means is provided with the return-to-start sensor to provide for manually selected return-to-start motion.

7. Mechanism according to claim 4 in which the start means includes a first manually-actuable signal means, signal means actuable by the motion of a machine tool element, and a sensor responsive to an adjacent perforation in the elongated member.

References Cited

UNITED STATES PATENTS 2,979,255    4/1961    Hubl.

DARYL W. COOK, Primary Examiner

T. J. SLOYAN, Assistant Examiner